Patented Aug. 9, 1938

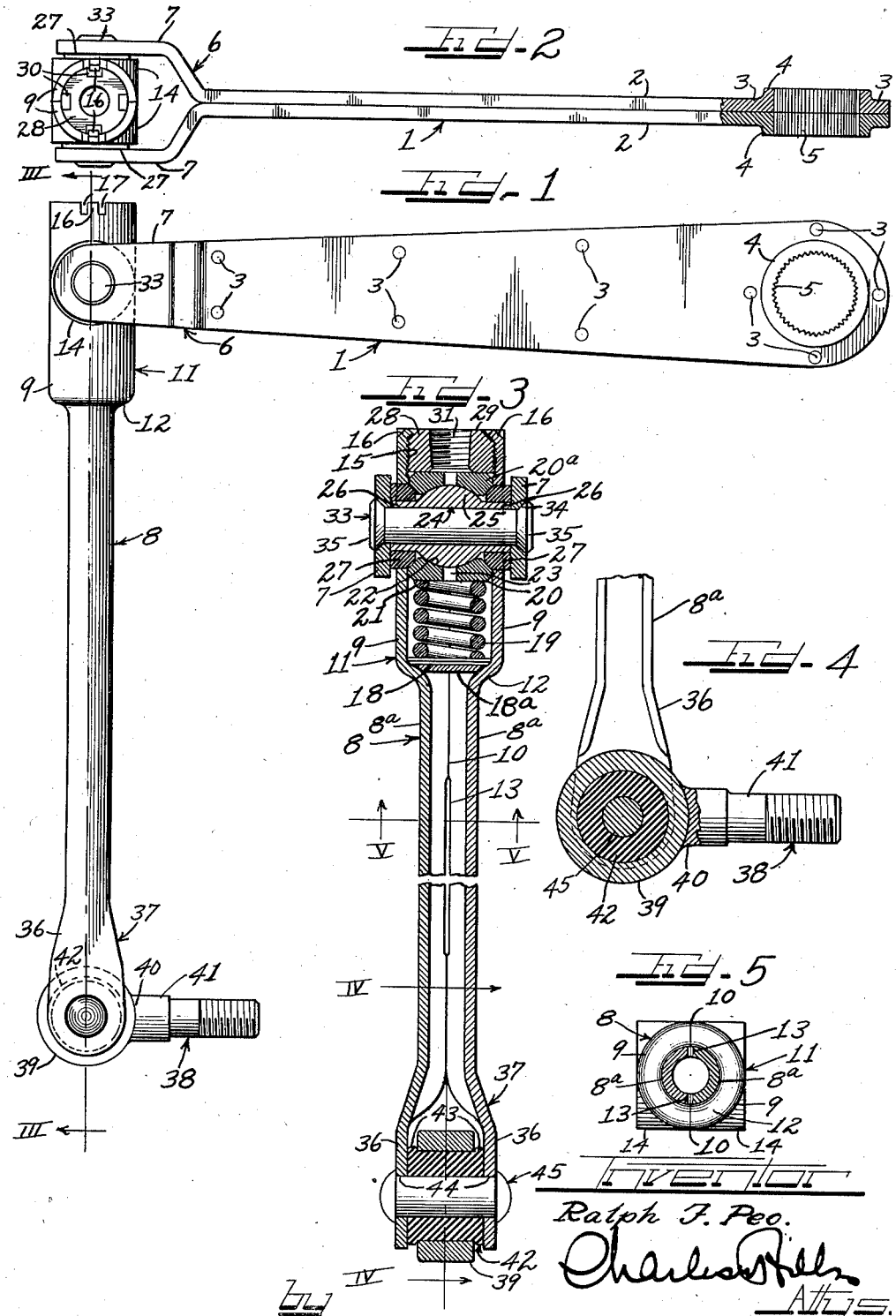

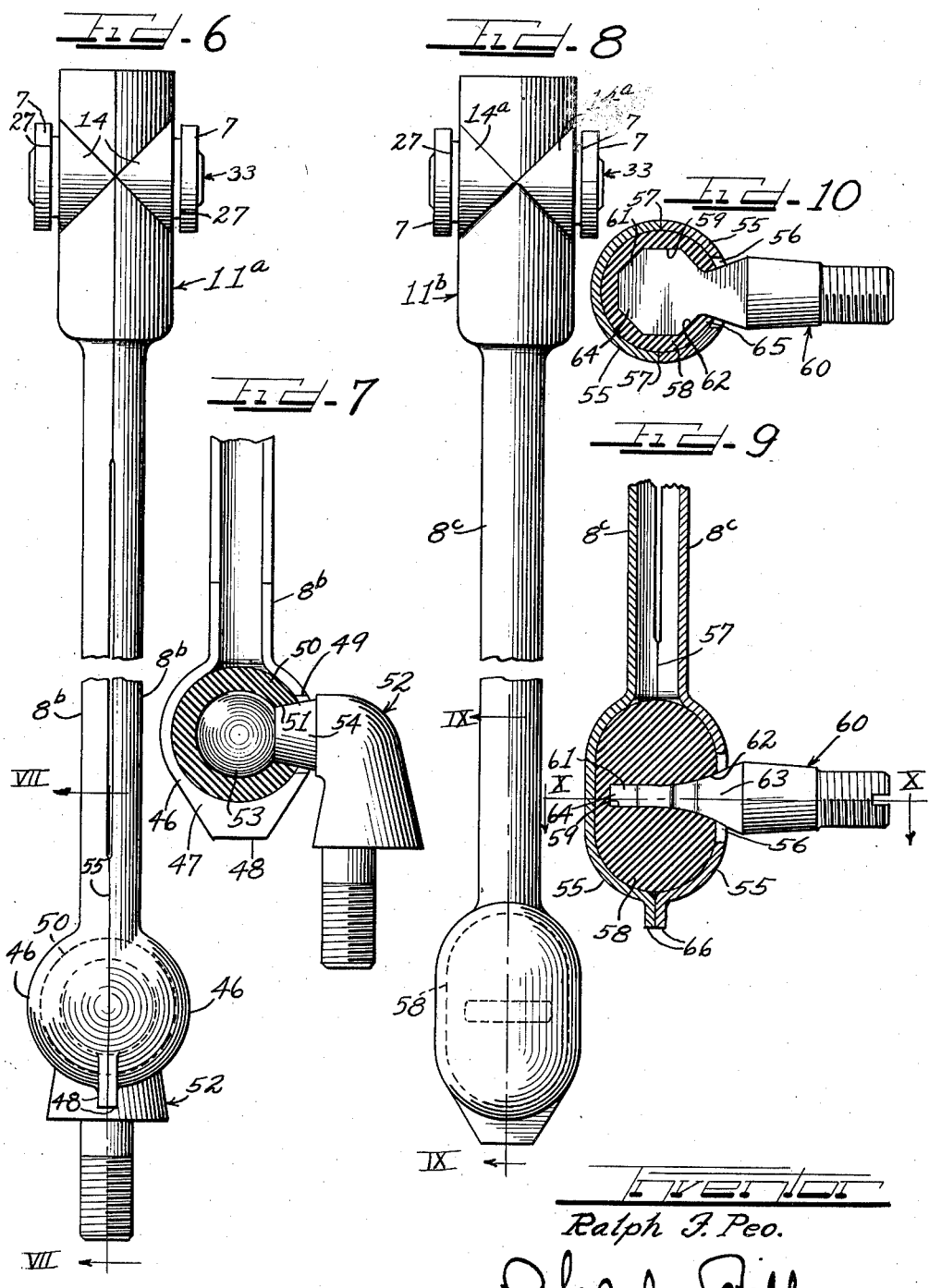

2,126,408

UNITED STATES PATENT OFFICE 2,126,408

LINK ASSEMBLY

Ralph F. Peo, Buffalo, N. Y., assignor to Houde Engineering Corporation, Buffalo, N. Y., a corporation of New York Application July 23, 1934, Serial No. 736,492

6 Claims. (Cl. 74—579)

This invention has to do with a link assembly and is concerned more particularly with such an assembly including oscillatory joints for use in connection with shock absorbers and the like.

It is an object of the invention to provide an improved connection between an oscillating shaft such as the rock shaft of a shock absorber and a movable device such as an axle or automobile wheel supporting member, through a linkage of improved construction occupying a minimum space transversely.

It is another object of the invention to provide, in a link assembly of this character, a rock shaft lever of substantially lighter construction than has heretofore been feasible, involving a substantial reduction in cost of manufacture without sacrifice of strength.

Another object of the invention involves an improved method of assembling parts of a link assembly.

It is a further object of the invention to provide an improved link assembly affording both cantilever and forked articulated joints for the drag link or connecting rod.

In accordance with the general features of the invention, there is provided a preferably tubular drag link or connecting rod member formed of united generally semi-cylindrical parts. One joint mechanism comprises a substantially ball and socket connection between the link and a lever connected to the rock shaft of a shock absorber preferably of the double acting type, and capable of assembly with the link after the parts thereof are united. The connected portion of the lever is preferably forked to avoid the stresses incident to a cantilever construction, and accordingly the lever may be of lighter construction such as sheet metal.

A joint mechanism at the other end of the link for establishing a connection with the axle or wheel supporting member is provided to enable the connected parts to articulate.

The various joint constructions preferably employ one or more resilient parts such as leather, rubber or composition substantially inert to lubricants and arranged to provide proper articulation between the connected members.

The joint connecting the link to the axle or other movable member may be of a character capable of being assembled with the link after the same is formed, or coincident with or prior to such formation.

Further objects and advantages of the invention will appear as the description proceeds.

The invention (in preferred forms) is illustrated on the drawings and hereinafter more fully described.

Figure 1 is an elevational view of a linkage embodying one form of the invention.

Figure 2 is a plan view of the upper part of the structure shown in Figure 1, a portion being shown in section to illustrate certain details.

Figure 3 is a longitudinal sectional view taken substantially as indicated by the line III—III in Figure 1, certain parts being shown in elevation.

Figure 4 is a fragmentary sectional view taken substantially in the plane designated by the line IV—IV in Figure 3, a portion being shown in elevation.

Figure 5 is a sectional view taken substantially as indicated by the line V—V in Figure 3.

Figure 6 is an enlarged fragmentary end elevation of a modified linkage structure.

Figure 7 is a fragmentary sectional view taken as indicated by the line VII—VII in Figure 6, one of the parts being shown in elevation.

Figure 8 is a view similar to Figure 6 but of a still further modified form of the invention.

Figure 9 is a fragmentary sectional view taken substantially as indicated by the line IX—IX in Figure 8, one of the parts being shown in elevation.

Figure 10 is a sectional view taken substantially in the plane designated by the line X—X in Figure 9, one of the parts being shown in elevation.

Referring now more particularly to the drawings, the lever 1, provided to establish a connection between the rock shaft of a double-acting shock absorber (not shown) and a connecting rod or drag link, is preferably formed of sheet metal stampings comprising substantially identical elongated pieces 2 which are united throughout preferably the major portions of their lengths as by spot-welding 3, bolts, rivets or any other suitable means. The pieces 2 are wider at one end than at the other end and, at the wider end, each is provided with a preferably cylindrical boss 4, forming a hub portion. When the pieces 2 are assembled, the bosses 4 are coaxially aligned and extend away from each other. A circular series of longitudinal serrations 5 is formed in the generally cylindrical hub formed by the bosses, the length of the serrations being thus substantially greater than the thickness of the sheet metal so as to enable the serrations to properly transmit stresses between the rock shaft (not shown) and said lever 1.

At their other and narrower ends, the pieces 2 are bent apart into spaced parallelism to provide a fork 6 whose arms are indicated at 7. This fork forms an essential part of the forked joint about to be described.

The drag link or connecting rod 8 is preferably tubular in form for the purpose of lightness without sacrificing strength, and comprises preferably mating substantially semi-cylindrical stampings 8a. Each element 8a has an enlarged end portion 9 and provides an edge extending longitudinally thereof and mating with the edge of the other element. The elements are preferably welded at 10 along said mating edges to provide a substantially integral tube having an enlarged end forming a housing 11. The inner end of the housing 11 is constricted to provide a shoulder 12.

The mating edges of the respective elements 8a are preferably longitudinally interrupted so that when they are united, a longitudinal space between portions of the elements 8a results adjacent each of the respective edges, as shown at 13. Thus any "high spots" in the intermediate parts of said edges are removed so as not to interfere with the proper engagement of the edges for welding purposes.

Each enlarged portion 9 is provided with an opening whose axis is at substantially right angles to the plane of its longitudinal edges, and said opening is bounded by a cylindrical wall 14 which is preferably flush with the portion 9 diametrically and whose length is determined at one end by said edges and at the other end by the outer surface of the portion 9 itself. When the elements 8a are united, the walls 14 are aligned with each other to form with the enlargement 11 substantially crossed cylindrical portions with the space common to them hollow.

When the elements 8a have been united, the outer end of the enlargement 11 is formed with an internal thread 15 and preferably with diametrically opposite bendable tongues, each being provided by cutting on opposite sides thereof kerfs 17.

The forked joint comprises mechanism which is presently described and assembled as follows:

A retainer and abutment plate or disc 18 is slidably fitted into the enlargement 11 and placed so as to rest against the shoulder 12. A preferably coiled spring 19 substantially filling the enlargement 11 transversely is fitted therein so as to abut the disc 18. A bearing disc 20 is slidably fitted in the enlargement 11 and is provided with a preferably flat side so as to engage the outer end 21 of the spring 19 and has on its opposite side a spherical surface 22. The disc 20 has a central lubricant opening 23 and, if desired, the spherical surface may be grooved (not shown) for receiving and retaining lubricant.

For cooperation with the spherical surfaced disc 20 there is provided a ball member in the form of a sleeve 24 having a spherical enlarged central portion 25 and substantially cylindrical and trunnion portions 26, the ball portion being of a size to readily enter the cylindrical portions 14. The spring 19 is normally of such a size as to project the bearing disc 20 substantially into the space common to the two cylindrical portions aforesaid. The ball member or sleeve 24 is inserted transversely through one of the cylindrical portions 14, and is ultimately to occupy a position wherein it is substantially coaxial with the cylindrical portions 14. When so positioned, the sleeve member 24, as will clearly appear hereinafter, causes the spring 19 to be compressed so that said spring at all times resiliently urges the ball member 24 toward the outer end of the enlargement 11. The length of the sleeve 24 is preferably slightly greater than the diameter of the enlarged portion or housing 11.

To the end that the sleeve member 24 may be resiliently trunnioned in the cylindrical portions 14 and that the spaces between the end portions 26 of the sleeve member 24 and said cylindrical portions 14 may be sealed, there are provided resilient grommets or rings 27 which are slidable snugly onto the sleeve ends 26 and into the cylindrical portions 14. A second bearing member 20a is fitted into the housing 11 so as to have its spherical surface engage the spherical surface of the sleeve member 24 preferably diametrically opposite the bearing member 20. Thereupon, a plug 28 is threaded in engagement with the threads 15 of the housing 11, and the outer end 29 of the plug 28 is preferably substantially flush with the outer end 32 of the housing 11 when adjusted to a position locating the ball sleeve member 24 in substantially coaxial relation with the cylindrical portions 14. The plug 28 may be provided with a threaded axial opening 31 for the reception of a lubricant fitting. The plug 28 is also provided preferably at its outer end 29 with a plurality of kerfs 30, four of which are illustrated, and the plug is preferably adjusted so that certain of the kerfs 30 are arranged to receive the bendable tongue 16 so as to lock the plug 28 in the desired position of adjustment.

The grommets 27 are preferably formed so that when first placed about the trunnion portions 26 and within the cylindrical portions 14 so as to engage the bearing members 20 and 20a, said grommets project outwardly beyond the ends of the portions 26. The arms 7 of the fork 6 are placed in engagement with the outer sides of the grommets 27, and this is preferably accomplished by compressing the grommets 27 inwardly against the bearing members 20 and 20a, and by flattening the grommets so as to cause the same to be compressed about the ball ends 26 and against the cylindrical portions 14. While this result may be effected in a number of ways, one convenient way may involve originally spacing the fork arms apart a distance substantially equal to the distance between the outer faces of the grommets 27 before the same are compressed, and positioning a pivot pin 33 in the opposed openings 34 in the arms 7 and through the sleeve 24, and heading the pin as at 35 into the countersunk portions of the arm openings 34, thereby forcing the arms 7 to be brought closer together into engagement with the sleeve 24.

When the parts are thus assembled, there is preferably a slight clearance between the arms 7 and the cylindrical portions 14, in order that relative movement between the lever 1 and link 8 in planes other than that of the axis of the link 8 and of the lever 1 may be possible.

With this assembly of parts, an articulated joint between the lever 1 and link 8 is provided. The forked arrangement of the lever 1 makes possible a joint which takes up relatively less space transversely than drag link or connecting rod articulated joints heretofore in vogue. The use of such a lever construction is made possible by the provision of the sheet metal straps 2 formed with the bosses 4 providing a hub of substantial length so that its serrations will properly transmit the turning stresses between the lever 1 and the rock shaft of the double acting shock absorber (not shown), and the hub will offer ample resistance to bending of the lever 1 due to stresses thereon transverse to the general plane of the lever. The employment of sheet metal therefore permits the use of a rock shaft lever of considerably lighter construction than has heretofore been the case.

At the other end of the link 8, provision is made for a universal or articulated connection with a movable member such as an axle or other wheel supporting member. This connection may take various forms, some of which are shown on the drawings.

One form of such connection is illustrated in Figures 1, 3 and 4. In this connection, the elements 8a, opposite the enlarged portions 9, are bent away from their axes to provide flattened end arms 36 which, when the elements 8a are united, form with the adjacent portions of the elements 8a a fork 37. Any suitable bolt or other means may be employed for connection to the axle or other movable member, that illustrated comprising an eye bolt 38 whose eye 39 is preferably in the form of a short section of a cylinder, welded to one end 40 of the threaded stem 41 of the bolt.

A rubber or other preferably pliable resilient sleeve 42 is formed to fit snugly in the eye 39 and is provided with end flanges 43 engageable with the respective ends of the eye 39 when the sleeve is fitted therein.

The fork arms 36 are provided with coaxial openings 44 preferably of substantially the same diameter as the interior of the resilient sleeve 42 for the passage therethrough of the pivot pin 45. The pivot pin 45 is headed over the outer sides of the fork arms 36 to provide an assembled articulated joint between the link 8 and bolt 38 by means of the intervening resilient sleeve 42. The pivot members 33 and 45, while shown in the form of rivets, may if desired be in the form of bolts or other means, the rivet means being however preferred. It will be observed that the connection between the link 8 and eye bolt 38 requires likewise a small amount of space transversely.

It will be seen from the foregoing that the connections at the ends of the link 8 are of such a character that the parts thereof may be assembled after the link 8 is formed, and in each connection the parts are so constructed and arranged as to require only a few moments for assembly.

If desired, the parts of the connection between the elements 8a and the eye bolt 38 may be assembled in their operative relation prior to uniting of the elements 8a. Once the parts are thus assembled, the connection provides a suitable means for holding the adjacent longitudinal edges of the elements 8a in engagement with each other preparatory to being melded together.

In Figures 6 and 7 is illustrated a modified form of connection between the link and the axle or other movable member. In this connection, each drag link element 8b is bulged into substantially semi-spherical form as at 46, with its edge 47 a continuation of the adjacent welding edge portions of the element. The area of the edge 47 is substantially enlarged by the provision of an ear 48 outwardly beyond the bulged portion 46 so that when the respective portions 46 are welded together along said edges, to provide a substantially complete hollow sphere, the welded ears 48 provide a reinforced end connection for the elements 8b which will effectively prevent spreading apart of the portions 46 due to stresses resulting from use of the linkage. Each semi-spherical portion 46 is cut away at the edge 49 to provide a substantially semi-circular opening whose axis may extend at any desired angle to the axis of the respective element 8b, said opening in the present instance being shown as at right angles to the axis of the element 8b. These openings in the portions 46 are so arranged that when the portions 46 are united, they form together a substantially circular opening 49.

A resilient hollow spherical member 50 is formed to have a force fit in the semi-spherical portions 46, and is provided with an opening 51 of substantially less diameter than the interior thereof and affording access thereto. A ball stud of any suitable shape such as the goose neck 52, and preferably threaded for connection to the axle or other movable member, is provided with a ball head 53 of a diameter to fit preferably tightly in the interior of the resilient member 50. The head 53 is insertable into the interior of the member 50 by forcing the same through the opening 51 in said member 50, the stud 52 being provided with a neck 54 of substantially less diameter than the opening 49 so as to be universally movable in said opening 49.

The joint assembly including the elements 8b and stud 52 is made by first forcing the stud head 53 into the resilient hollow spherical member 50, placing the member 50 in one of the semi-spherical portions 46, placing the other semi-spherical portion 46 thereover so as to bring the respective edges 47 together and form the opening 49, and welding said surfaces 47 together at 55. At the time this welding takes place, the remaining mating edges of the elements 8b may also be welded together. Thereafter, the enlargement or housing 11a may be threaded similarly to the housing 11 and then the housing connected to the forked lever 1 as hereinabove described.

A further form of connection between the link and the movable member such as the axle or other wheel supporting part is shown in Figures 8, 9 and 10. In this modification, each of the link elements 8c is formed at one end so as to provide with the other a housing 11b having aligned, transversely extending semi-cylindrical portions 14a. At its opposite end each element 8c is bulged to provide a portion 55 which is preferably other than spherical. In the illustration, the shape of each bulged portion 55 resembles an oblate spheroid or ellipsoid, the ends being in the form of quarter spheres and the intermediate portion being in substantially the form of a semi-cylinder. The shape may perhaps be more clearly appreciated when the bulged portions are united since then they form together an enlarged housing which may be said to comprise substantially semi-spherical ends and a substantially cylindrical intermediate portion.

One of the bulged portions 55 is provided with an elongated opening 56 extending generally parallel to the element 8c and preferably disposed in the semi-cylindrical portion thereof, preferably substantially equidistant from the marginal edges 57 thereof.

A resilient member 58 having preferably the shape of the interior of the combined portions 55 and of a size preferably such as to enable the same to fit tightly therein, is preferably formed of molded rubber and provided with a polygonal opening 59 extending transversely to the opening 56 in one of the bulged portions 55. A stud 60 formed to be connected rigidly to the axle or other movable member supporting the wheel is provided with a similarly shaped polygonal head 61 formed to fit snugly in the opening 59. The opening 59 is flared outwardly at 62 and the corresponding portion of the stud 60 is similarly flared at 63. The head 61 at its greatest width is of such a size as to pass through the longitudinal portion of the opening 56, but is incapable of being passed through the narrow portion of the opening 56.

The polygonal shape of the head 61 affords a tapered portion 64 at the outer end of the head, enabling the head to be forced into the flared portion 62 of the opening 59 in the resilient member 58, transverse to the opening 59. As the stud 60 is forced farther into the member 58, the member 58 at the opening 59 is substantially distorted. The member 58 as a whole, however, is held rigidly by the bulged portions 55 so that it cannot move relative thereto. After the widest portion of the head 61 has passed inwardly beyond the opening 62, the stud 60 may be released, or it may be turned slightly by hand, allowing the distorted portions of the member 58 thereafter to rotate the stud head 61 into parallelism with the opening 59 so as to properly fill the same, the head 61 then extending transversely to the opening 56 and being securely held in position by the constricted portion 65 of the resilient member 58. Sufficient clearance is provided between the flared neck portion 63 of the stud 60 and the opening 56 to allow limited universal movement between the united elements 8c and the stud 60 and the movable member to which the same may be attached.

The connection just described, it will be observed, locates the stud 60 at substantially a right angle to the forked lever 1, whereas in the previously described forms of the invention, the stud extends in the same general direction as the lever 1, relative to the link.

It is to be observed that in the form of the invention appearing in Figures 8, 9 and 10, the bulged portions 55 are provided at their outer ends with reinforcing ears 66 having the same function as the ears 48 of the form of the invention illustrated in Figures 6 and 7 and hereinabove described.

In the form of Figures 8, 9 and 10, it will be seen that the resilient member 58 is assembled with the elements 8c at the time that said elements are welded or otherwise suitably united together.

The bearing members 20 and 20a may be made of any suitable material, phosphor bronze having been found satisfactory. The grommets 27 may be made of rubber or any suitable resilient composition including rubber as a substantial ingredient, or of leather or other suitable material. The other resilient elements 42, 50 and 58 may be made of like material. The remaining parts are preferably made of metal.

When the sections 8c are united, the semi-cylindrical portions 14a together provide cylindrical walls cooperating with the associated ball mechanism in the same way as the cylindrical walls 14 heretofore described.

In order to insure against leakage of oil from the housing into the reduced part of the link, a gasket 18a of paper, rubber or other suitable material is arranged under the disc 18 so as to be compressed between said disc and the shoulder 12.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A connecting member comprising complementary elongated metal sections secured together to define at one end thereof an enlarged hollow tubular portion having oppositely disposed openings in the side walls thereof defined by upstanding wall portions forming a flat edge for the openings and a housing at the other end, a universal joint in said tubular portion, a yoke member connected to said joint outside of the tubular portion, and a stud member seated in said housing.

2. A link assembly comprising complementary elongated metal sections secured together along mating edges thereof to form at one end thereof an enlarged hollow tubular portion having oppositely disposed openings in the side walls thereof defined by upstanding wall portions forming a flat edge for the openings and a female joint housing at the other end, a universal joint in said tubular portion, a yoke member connected to said joint outside of the tubular portion, a rubber bushing in said female joint housing, and a stud member seated in said rubber bushing inside of the housing.

3. A link assembly comprising complementary elongated sections secured together along mating edges thereof to form at one end a housing having intersecting cylindrical walls providing an axial and a transverse bore, a universal bearing assembly within said bores including a member having ends extending freely through the transverse bore, a bifurcated member connected to said ends, said sections defining at the other end thereof a female joint housing, a resilient bushing in said housing and a stud member seated in said bushing whereby the bifurcated member and the stud member are operatively connected by the secured together sections and universally movable relative thereto and to each other.

4. A link assembly comprising complementary elongated sections secured together along mating edges thereof to provide at one end a housing having intersecting cylindrical walls forming an axial and a transverse bore, a universal bearing assembly within said bores including a member having ends extending through the transverse bore, resilient grommets surrounding the extended ends and in annular contact with the wall of the transverse bore, a bifurcated member having the furcations thereof connected to the extended ends and in contact with the grommets, said sections defining at the other ends thereof a female joint housing, a resilient bushing in said housing and a stud member seated in said bushing whereby the bifurcated member and the stud member are operatively connected by the secured together sections and universally movable relatively thereto and to each other with the resistance to universal movement controlled by the resiliency of the grommets and bushing.

5. A link assembly comprising an elongated member providing at one end thereof a housing having intersecting cylindrical walls forming an axial and a transverse bore, a universal bearing assembly within said bores including a member having ends extending through the transverse bore, a bifurcated member having the furcations thereof connected to the extended ends, said member defining at the other end thereof a female joint housing, a resilient bushing in said housing and a stud member seated in said bushing whereby the bifurcated member and the stud member are operatively connected by the elongated member and are universally movable relative thereto and to each other.

6. A link assembly comprising an elongated member providing at one end thereof a housing having intersecting cylindrical walls providing an axial and a transverse bore, a universal bearing assembly within said bores including a member having ends extending freely through the transverse bore, resilient grommets surrounding the extended ends and in annular contact with the wall of the transverse bore, a birfurcated member having the furcations thereof connected to the extended ends and in contact with the grommets, said member defining at the other end thereof juxtaposed forked elements, a resilient bushing disposed between said forked elements, and a stud member seated in said resilient bushing whereby said bifurcated member and said stud member are operatively connected and universally movable relative to each other with the resistance to universal movement controlled by the resiliency of the grommets and bushing.

RALPH F. PEO.